April 13, 1965     E. L. FOOTE     3,178,555

ELECTRIC ARC WELDING APPARATUS

Filed March 30, 1964

INVENTOR.
Edward L. Foote

BY
*Walter S. Murray*
ATTY.

3,178,555
ELECTRIC ARC WELDING APPARATUS
Edward L. Foote, 10590 Fallis Road, Loveland, Ohio
Filed Mar. 30, 1964, Ser. No. 355,617
3 Claims. (Cl. 219—131)

This invention relates to electric arc welding apparatus and has for its principal object the provision of a novel and improved low frequency stabilizer for A.-C. inert gas, arc welding processes that operates on a multi-phase electric power supply and is capable of producing a strong arcing current for the welding electrode while keeping the welding electrode ionized as it goes through its zero welding phases.

Another object of the invention is to provide a simplified arc welding apparatus that produces continuous ionization at the welding electrode and thus a stable and relatively strong welding current without the utilization of high frequency currents presently superimposed as arc stabilizers, especially when welding aluminum, or the like.

A further object of the invention is to provide an improved A.-C., multi-phase inert arc welder wherein a conventional single phase, welding transformer is connected to one phase of the multi-phase power supply and to the welding electrode; said phase and the remaining phases of the power supply being several electrical degrees apart and the remaining phases connected to an auxiliary multi-phase transformer supplying ionizing voltage to one or several contacts adjacent said welding electrode; whereby interphase arcing within the electrode torch is accomplished and the welding electrode continuously ionized for use at all times after the arc is struck.

The invention will be more fully and comprehensively understood from a consideration of the following detailed description when read in connection with the accompanying drawings which form a part of the application, it being understood, however, that the improvement is capable of extended application and is not confined to the exact showing in the drawing nor to the precise construction described and, therefore, such changes and modifications may be made therefrom as do not affect the spirit of the invention as expressed in the appended claims.

Figure 1:
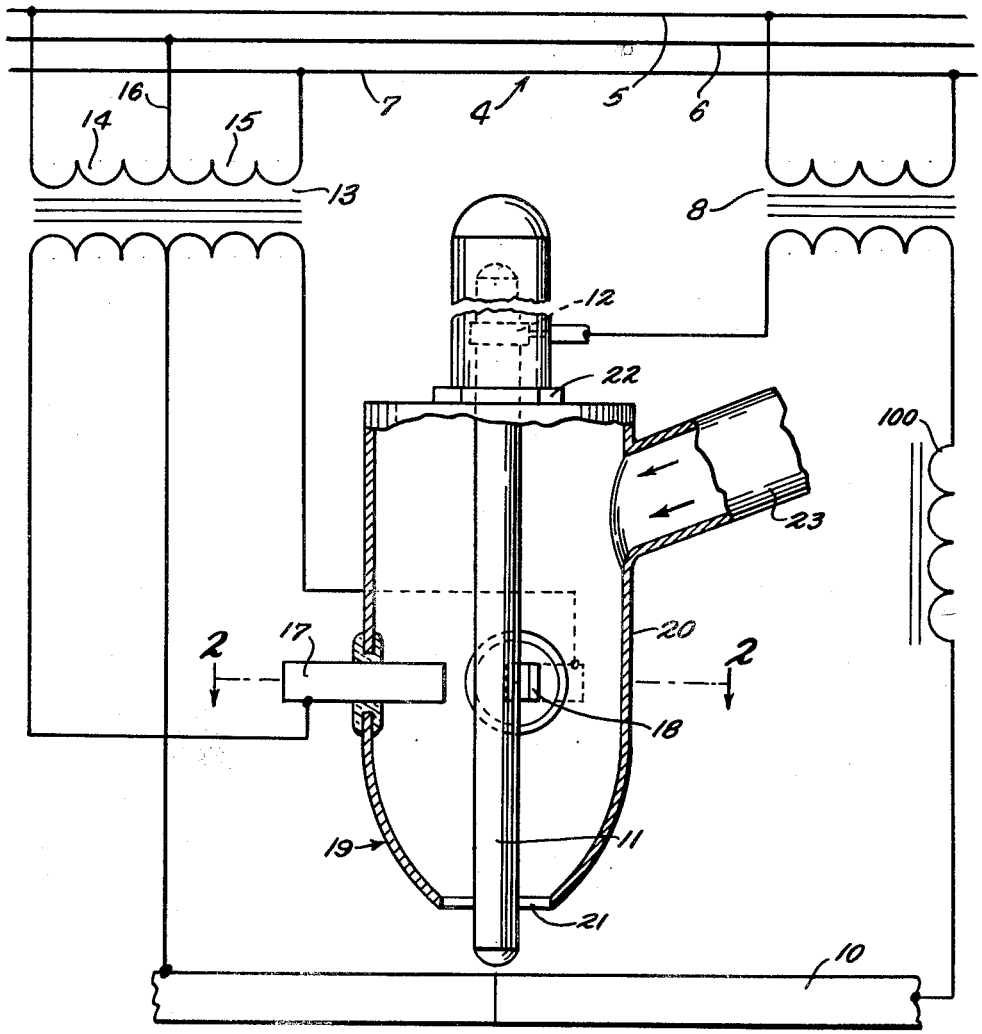
FIG. 1 is a view of my apparatus showing the arc welding electrode holder or torch in section, the electric circuit therefor being schematically shown therein.
Figure 2:
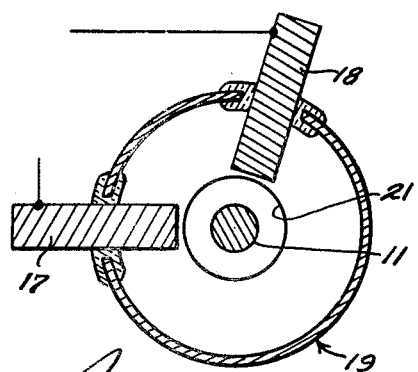
FIG. 2 is a section taken on line 2—2 of FIG. 1.

With particular reference to FIG. 1 the numeral 4 indicates a multi-phase source of low frequency, A.-C. electric power which may have three phases, exemplified by first, second and third power lines 5, 6 and 7, respectively. A conventional single phase welding transformer 8 has its primary winding connected to power lines 5 and 7 of the A.-C. electric power supply 4, the secondary winding of said transformer having one end coil connected to a piece of work 10 through a reactor 100 and the opposed coil connected to a welding electrode 11 in any suitable manner such as by an electrical connector 12. An auxiliary, mulit-phase ionizing transformer 13 has two independent primary windings 14 and 15 connected to the power supply in a manner such that their common lead 16 is connected to power line 6 whilst the end coil of the primary 14 is connected to the power line 5 and the end coil of the primary 15 is connected to the power line 7. The common connection of the secondary windings of the transformer 13 is connected to the work 10 whilst the end coils of the secondary are each connected to an electrode ionizing contact 17 and 18.

A conventional welding torch 19 is shown in the drawings as having a tubular hood 20 which terminates at its lower end in an enlarged opening 21 through which the lower end of the welding electrode projects, the upper end of the hood being provided with a suitable, adjustable means 22 for mounting the electrode axially within the hood. The electrodes 17 and 18 are secured in any suitable manner on and electrically insulated from the hood, said contacts projecting therefrom for contact with the transformer leads. The hood is provided with a hollow handle 23 that may be made one piece with the body of the hood to project upwardly therefrom, the free end of the handle being connected to a hose coupling (not shown), led from a source of inert gas such as a pressurized tank, or the like. The inert gas is introduced to the interior of the hood 20 through the handle 23 and excess gas in the hood passes through the hole 21 to provide circulation of the gas around the lower end of the electrode and out through the opening around the work.

My invention therefore consists in an improved inert gas, arc welding apparatus operated on low frequency, multi-phase alternating current with a conventional single phase welding transformer connected to one phase of the electric power while an auxiliary transformer connected to the other phases of said power source supplies ionizing voltage to the welding electrode. Thus, when the welding electrode is going through the zero points of its particular cycle the ionizing electrode contacts are operative to keep the electrodes ionized and ready to fire, it being noted that the auxiliary transformer 13 does not supply welding current to the electrode but merely maintains the welding electrode in an ionized condition ready to produce welding current in the welding phase when its zero point has been passed.

Several power line adaptations may be made by those skilled in the art to suit unusual power line conditions namely a "Scott" or "Taylor" two to three phase could be used, the two phase line being particularly adaptable since when the welder phase is at zero the second phase would be at peak.

The ionizing transformer may be quite small and cheaply made since it does not carry welding current, and it may further be used as an attachment with any single phase welding transformer, after a few minor modifications are made on existing welding torches to include the ionizing contacts.

Having thus described my invention, what I claim as new is:

1. In welding apparatus the combination of a piece of work, a multi-phase power supply line, a single-phase welding transformer connected to the power supply line, a multi-phase auxiliary ionizing transformer connected to the power supply line, an inert gas hood, a welding electrode mounted within the hood and having one end projecting therefrom, an electrical connection between the electrode and the welding transformer, an electrical connection between the work and the welding transformer, an ionizing contact mounted within the hood in close proximity to the welding electrode, an electrical connection between the contact and the ionizing transformer, and an electrical connection between the ionizing transformer and the work.

2. In welding apparatus the combination of a piece of work, a source of low-frequency, multi-phase A.-C. electric power, power lines connected to said source, a single-phase welding transformer connected by the power lines to one phase of the electric power, a multi-phase auxiliary ionizing transformer connected by the power lines to several phases of the electric power, an inert gas welding hood having an opening in its lower end, a welding electrode mounted within the hood and having its lower end projecting therefrom through the opening, an electrical connection between the electrode and the welding transformer, an electrical connection between the work and the welding transformer, an ionizing contact mounted within the hood in close ionizing proximity to the electrode, an electrical connection between the contact and the ionizing transformer, an electrical connection between the ionizing transformer and the work, and means for introducing inert gas into the hood and out through the opening therein.

3. In welding apparatus the combination of a piece of work, a source of low-frequency, three phase A.-C. electric power, first, second and third power lines connected to said source, a welding transformer having its primary winding connected to the first and third power lines, an auxiliary, ionizing transformer having a pair of independent primary windings, a common lead for said windings connected to the second power line, the end coils for said pair of windings being connected to the first and third power lines, an inert gas welding hood having an opening in its lower end, a welding electrode mounted within the hood and having its lower end projecting from the hood through the opening, an electrical connection between the electrode and the secondary of the welding transformer, an electrical connection between the secondary of the welding transformer and the work, a pair of ionizing contacts mounted within the hood in close, ionizing proximity to the electrode, an electrical connection between each independent secondary of the ionizing transformer and each contact, an electrical connection between the work and the common connection between the independent secondary windings of the ionizing transformer, and means for introducing inert gas into the hood around the electrode and contacts and out through the opening therein.

References Cited by the Examiner

UNITED STATES PATENTS

| | | | |
|---|---|---|---|
| 1,869,207 | 7/32 | Martin | 315—262 |
| 2,892,072 | 6/59 | Miller | 219—131 |

RICHARD M. WOOD, *Primary Examiner.*